United States Patent [19]

Myers

[11] 4,237,517

[45] Dec. 2, 1980

[54] MOTION MONITORING APPARATUS

[75] Inventor: Donald M. Myers, Berrien Springs, Mich.

[73] Assignee: Ludlow Industries, Inc., Batavia, Ill.

[21] Appl. No.: 900,889

[22] Filed: Apr. 28, 1978

[51] Int. Cl.³ ............................................. G01D 3/48
[52] U.S. Cl. .................................. 361/239; 361/240; 361/179; 340/870.2
[58] Field of Search ................. 331/65; 324/176, 207, 324/208, 178, 236, 163; 361/170, 180, 181, 187, 203, 239, 240; 310/168; 340/310 R, 671, 195, 201 R, 203

[56] References Cited

U.S. PATENT DOCUMENTS

| | | | |
|---|---|---|---|
| 2,883,538 | 4/1959 | Elam | 324/236 |
| 2,922,880 | 1/1960 | Elam | 361/180 X |
| 3,015,077 | 12/1961 | Elam, et al. | 361/203 X |
| 3,281,665 | 10/1966 | Forster, et al. | 324/236 |
| 3,455,162 | 7/1969 | Michener, et al. | 340/201 R |
| 3,541,369 | 11/1970 | Murakami | 310/168 |
| 3,546,530 | 12/1970 | Simonsen | 361/239 |
| 3,619,805 | 11/1971 | Bean | 324/207 X |
| 3,652,887 | 3/1972 | Taubitz et al. | 310/168 |
| 3,659,277 | 4/1972 | Brown | 340/203 |
| 3,728,565 | 4/1973 | O'Callaghan | 340/195 |
| 3,742,477 | 6/1973 | Enabnit | 331/65 X |
| 3,758,845 | 9/1973 | MacKelvie, et al. | 340/195 |

FOREIGN PATENT DOCUMENTS

| | | | |
|---|---|---|---|
| 1031562 | 6/1966 | United Kingdom | 361/236 |
| 1448487 | 9/1976 | United Kingdom | 361/236 |
| 1487398 | 9/1977 | United Kingdom | 361/236 |

*Primary Examiner*—J. D. Miller
*Assistant Examiner*—L. C. Schroeder

*Attorney, Agent, or Firm*—Burmeister, York, Palmatier, Hamby & Jones

[57] ABSTRACT

Apparatus for monitoring the motion of a movable element, such as a rotatable shaft, comprising sensor means for producing a series of repetitive pulses in response to the motion of the movable element, ramp generator means for producing an increasing ramp signal, the ramp generator means including means for resetting the ramp signal to a starting level in response to each of the pulses, level detector means operable in response to the increase of the ramp signal above a predetermined level, and control means for performing a control function in response to the operation of the level detector means. The sensor means preferably include at least one conductive member, means responsive to the movement of the movable element for producing corresponding movement of the conductive member along a closed path, an inductance coil adjacent the path but spaced therefrom, oscillator circuit means for producing oscillations in the inductance coil, such oscillations being modulated by the passage of the conductive member near the coil, and pulse producing means for producing one of the repetitive pulses in response to each modulation of the oscillations by the conductive member. The ramp generator means preferably comprise a timing capacitor, means for charging the capacitor at a controlled rate to produce the ramp signal across the capacitor, and means for discharging the capacitor in response to each of the repetitive pulses to reset the ramp signal to zero. The level detector means preferably comprise voltage comparator means for comparing the ramp signal with a predetermined voltage level. The control means preferably include a relay operable in response to the operation of the level detector means.

4 Claims, 6 Drawing Figures

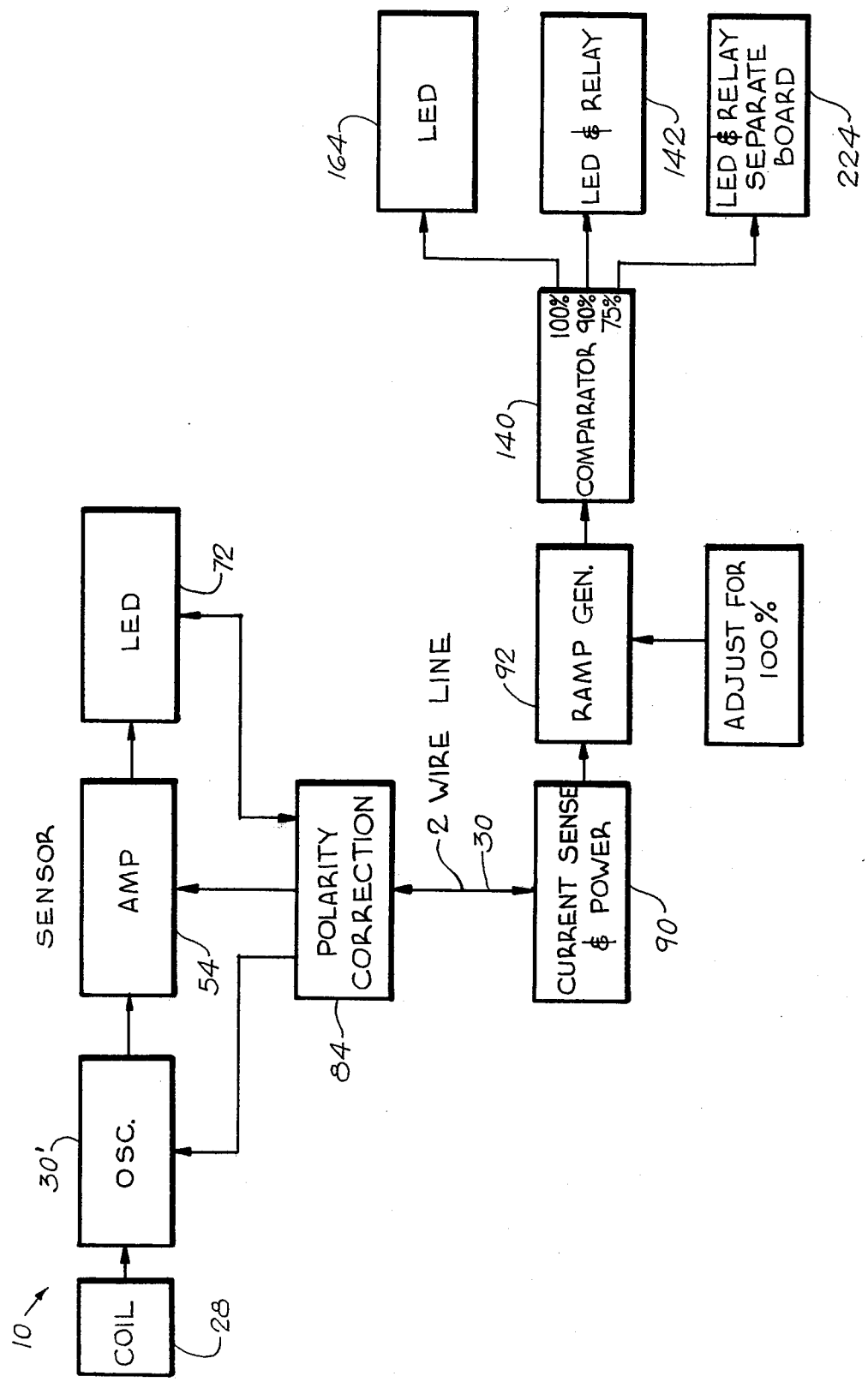

MOTION MONITORING APPARATUS

This invention relates to apparatus for monitoring the motion of a movable element, such as a rotatable shaft or some other movable machine component, for example.

There is an increasing demand for effective yet inexpensive devices for monitoring the motion of conveyors and other machines, particularly machines which operate automatically and unattended. If a conveyor or other machine is operating at its normal speed, there is usually no cause for alarm. However, if the operating speed of a conveyor or the like drops much below normal, a potentially dangerous overload situation may exist, calling for immediate attention by the operator. If the drop in speed is sufficiently great, it may be advisable to stop the operation of the conveyor on an automotic basis, so that the difficulty which is causing the speed reduction can be remedied before damage is caused to the conveyor or associated equipment. Serious accidents, such as the breakage of a conveyor belt, can thus be avoided.

Thus, one object of the present invention is to provide new and improved motion monitoring apparatus which will actuate an alarm if the motion of a rotatable shaft or some other movable element departs from its normal speed by a predetermined factor.

A further object is to provide such new and improved motion monitoring apparatus which is capable of shutting down the machine being monitored, if the speed of the machine departs sufficiently from its normal value.

To achieve these objects, the present invention preferably provides a device for monitoring the motion of a movable element, such as a rotatable shaft, comprising sensor means for producing a series of repetitive pulses in response to the motion of the movable element, ramp generator means for producing an increasing ramp signal, the ramp generator means including means for resetting the ramp signal to a starting level in response to each of the pulses, level detector means operable in response to the increase of the ramp signal above a predetermined level, and control means for performing a control function in response to the operation of the level detector means.

The sensor means preferably include at least one conductive member, means responsive to the movement of the movable element for producing corresponding movement of the conductive member along a closed path, an inductance coil adjacent such path but spaced therefrom, oscillator circuit means for producing oscillations in the inductance coil, the oscillations being modulated by the passage of the conductive member near such coil, and pulse producing means for producing one of the repetitive pulses in response to each modulation of the oscillations by the conductive member.

The oscillator circuit means preferably include feedback means for maintaining the oscillations in the absence of the conductive member while causing termination of the oscillations whenever the conductive member passes the coil.

The ramp generator means preferably comprise a timing capacitor, means for charging the capacitor at a controlled rate to produce the ramp signal across the capacitor, and means for discharging the capacitor in response to each of the repetitive pulses to reset the ramp signal to zero. Means are preferably provided for adjusting the controlled rate at which the capacitor is charged, and thereby adjusting the rate of increase of the ramp signal.

The ramp generator means preferably include an operational current amplifier having an output as well as inverting and noninverting inputs, the timing capacitor being connected between the output and the inverting input, means for supplying current at an adjustable controlled rate to the noninverting input and thereby causing the capacitor to be charged at a corresponding controlled rate, and means for supplying the repetitive pulses to the noninverting input for causing the discharge of the capacitor in response to each of the pulses, whereby the ramp signal at the output is reset to zero. The adjusting means for adjusting the rate of current flow to the noninverting input makes it possible to adjust the rate of increase of the ramp signal.

The level detector means preferably comprise voltage comparator means for comparing the ramp signal with a predetermined voltage level. The device also preferably includes means for adjusting the level of the ramp signal in relation to the predetermined voltage level.

The control means preferably include an alarm device, and also a relay operable in response to the operation of the level detector means.

The sensor means preferably include pulse producing means comprising a nonlinear amplifier connected to the oscillator circuit means for producing an output signal which varies in accordance with the modulation of the oscillations by the conductive member. In this way, the sensor means may be mounted separately as a remote unit, with only a simple two-wire cord connected between the sensor means and the remainder of the apparatus.

When the motion of a rotatable shaft is to be monitored, the movable member is preferably embedded in an insulating disc, adapted to be mounted on the shaft.

Further objects, advantages and features of the present invention will appear from the following description, taken with the accompanying drawings, in which:

FIG. 3 is a block diagram of the motion monitoring apparatus.

Figure 2:
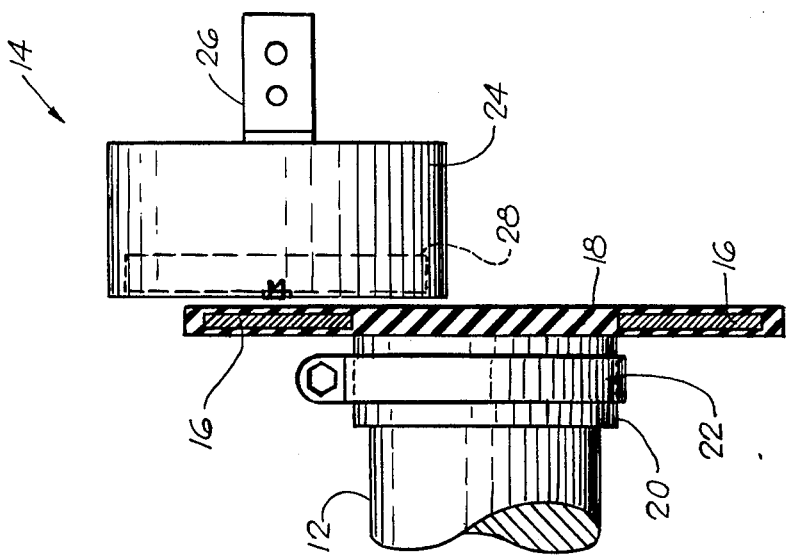
FIG. 2 is a diagrammatic plan view, partly in section along a line 2—2 in FIG. 1.
Figure 1:
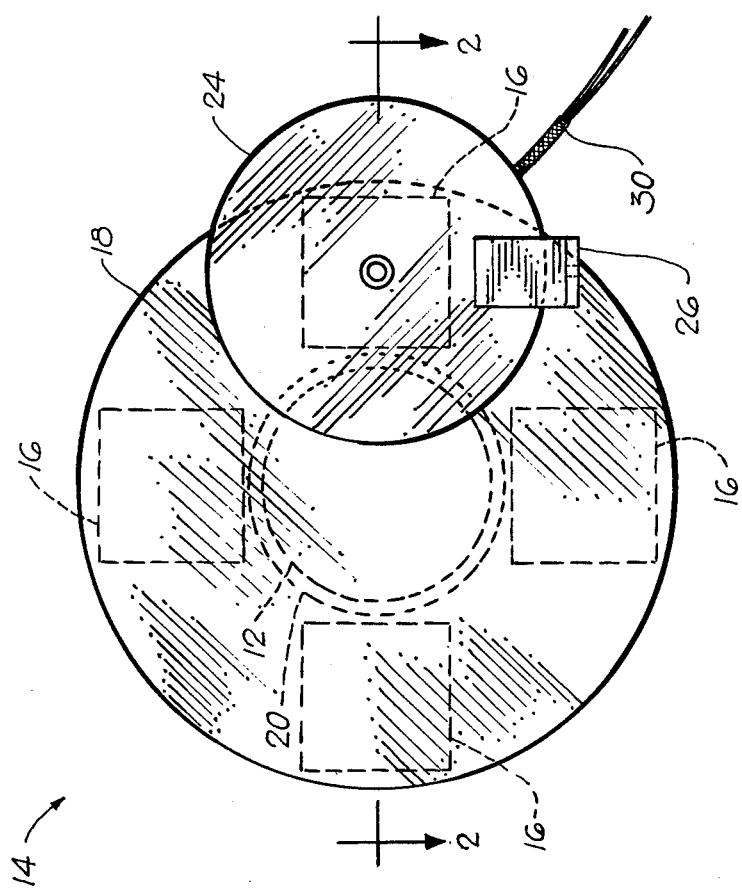
FIG. 1 is a diagrammatic elevational view of a rotatable disc and a sensor unit, constituting components of motion monitoring apparatus to be described as an illustrative embodiment of the present invention.

As just indicated, the drawings illustrate a device or apparatus 10 for monitoring the motion of a movable member, which may, for example, be a rotatable shaft 12, as illustrated in FIGS. 1 and 2. The motion monitoring apparatus 10 is extremely valuable for monitoring the motion of machines of all kinds, particularly conveyors, for example. Thus, the movable member 12 may be the shaft of a conveyor drive wheel or pulley, or an idler wheel or pulley of a conveyor. During the normal operation of the conveyor or other machine, the shaft 12 rotates at a particular speed, determined by the speed of the driving motor. The rotary speed of the shaft 12 may vary over a limited range during the normal operation of the machine or conveyor. However, if the conveyor or other machine is overloaded, the speed of the shaft 12 will drop or depart from the normal speed by a greater amount. Other difficulties in the operation of the machine or conveyor may cause the speed of the shaft 12 to drop below the normal operating range.

The motion monitoring apparatus 10 detects any abnormal drop in the operating speed of the shaft 12 and actuates an alarm, so as to warn the operator that the conveyor or other machine needs attention, to determine and rectify the cause of the subnormal operating speed. The motion monitoring apparatus 10 is also capable of stopping the conveyor or other machine, so that the operating difficulty can be remedied, before damage is done to the machine.

As shown in FIGS. 1 and 2, the motion monitoring apparatus 10 preferably comprises sensor means 14 for checking and determining the operating speed of the rotatable shaft 12. In this case, the sensor means 14 produce a series of repetitive pulses in response to the motion of the rotatable shaft 12, or any other appropriate movable element.

As shown in FIGS. 1 and 2, the sensor means 14 preferably comprise one or more conductive members 16, and means responsive to the movement of the movable element 12 for producing corresponding movement of the conductive member or members 16, along a closed path. In this case, there are four of the movable members 16 which are carried by a rotatable member 18, rotatable with the shaft 12. The member 18 is shown as a carrier disc which is mounted on one end of the shaft 12. Any suitable means may be employed to secure the carrier disc 18 to the end of the shaft 12. As shown, the disc 18 is formed with an axial mounting sleeve or hub 20 which is slipped over the end of the shaft 12 and is secured thereon by any suitable means, such as the illustrated clamp 22. Alternatively, the disc or other carrier 18 may be secured to the shaft 12 by any suitable adhesive, or by one or more permanent magnets.

The illustrated disc 18 is made of rubber or any other suitable electrically insulating material. The conductive members 16 are embedded in the outer portion of the disc 18. However, the conductive members 16 may simply be secured to the disc 18.

While the illustrated sensor means 14 comprise four of the conductive members 16, it will be understood that the number of conductive members 16 may be varied, ranging from a single member to five or more members, depending upon the desired number and spacing of pulses to be produced by the sensor means 14. It is highly advantageous to embed the conductive members 16 in the rubber disc 18, so that the disc will have outer surfaces which are smooth and unbroken. This is an important consideration from the standpoint of safety.

It will be evident from FIGS. 1 and 2 that the disc 18 carries the conductive members 16 around a closed path, which is of circular shape in this instance. The sensor means 14 include a sensor head or unit 24 which is positioned close to the path of the conductive members 16. There can be considerable spacing between the sensor head 24 and the carrier disc 18. The illustrated sensor head 24 includes a mounting bracket 26 for mounting the sensor head 24 on any desired support.

The sensor head 24 preferably includes an inductance coil 28 which is opposite the path of the conductive members 16. In a manner to be described presently, oscillations are modulated by the passage of the conductive members 16. Such modulations are employed to produce a series of repetitive pulses, corresponding to the motion of the movable shaft or element 12.

As shown in FIG. 1, the illustrated sensor head 25 is preferably connected to the remainder of the motion monitoring apparatus 10 by a simple two wire cord 30, which does not need to be shielded. The two wire cord 30 supplies the necessary operating power to the sensor unit 24, while also transmitting the repetitive pulses from the sensor head 24 to the remainder of the motion monitoring apparatus 10.

Figure 4:
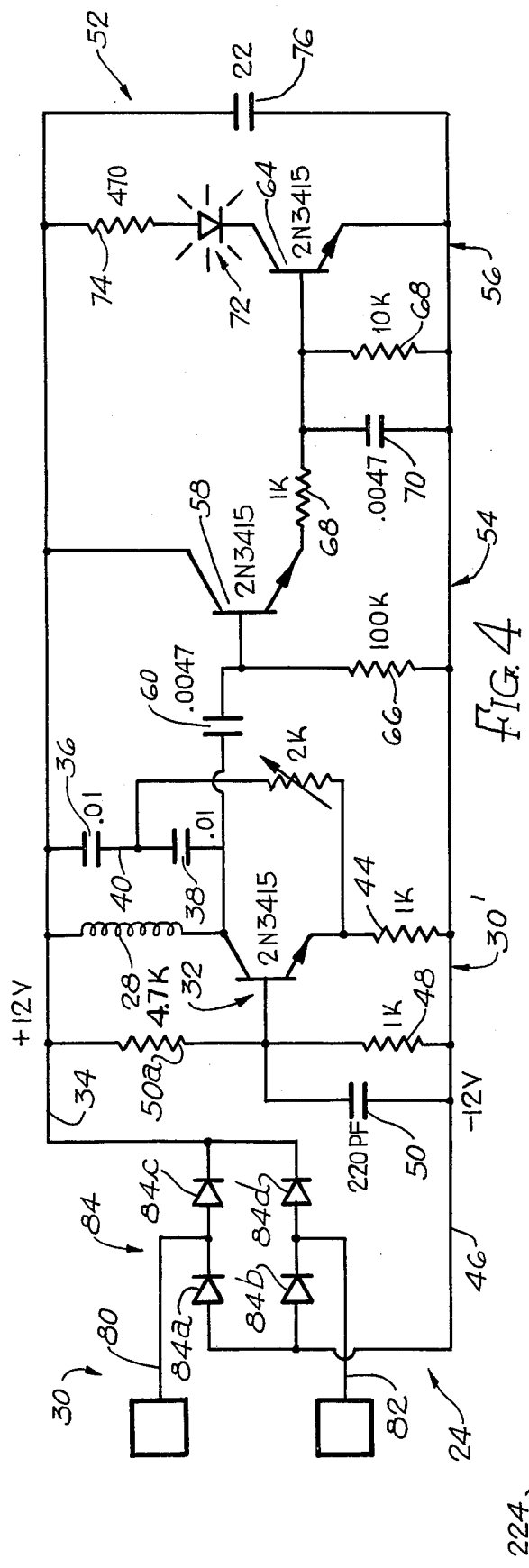
FIG. 4 is an electronic circuit diagram of the sensor.

As is shown in the circuit diagram of FIG. 4, the sensor unit 24 preferably comprises oscillator circuit means 30' for producing oscillations in the coil 28. Various oscillator circuits may be employed. As shown, the oscillator circuit 30' includes a transistor 32 having its collector connected to one end of the conductive coil 28. The other end of the coil is connected to a power supply line 34, which in this case is positively polarized. A suitable voltage, such as plus 12 volts, for example, is supplied to the power supply line 34.

To form a resonant circuit with the inductance coil 28, two capacitors 36 and 38 are connected in series across the coil 28. The junction lead 40 between the capacitors 36 and 38 is connected through a variable feedback resistor 42 to the emitter of the transistor 32. A biasing and load resistor 44 is connected between the emitter and a negative power supply line 46.

Another resistor 48 is connected between the negative power line 46 and the base of the transistor 32. A capacitor 50 is connected in parallel with the resistor 48. A biasing resistor 50a is connected between the positive power supply line 34 and the base of the transistor 32. The resistors 48 and 50a establish the bias on the base of the transistor 32 and provide temperature compensation to stabilize the oscillator circuit 30'.

When each conductive member 16 moves into the field of the inductance coil 28, the strength of the oscillations in the coil 28 is decreased, because energy is coupled out of the coil 28 and into the conductive member 16 by mutual induction, so as to produce circulating currents in the conductive member 16. Such circulating currents produce losses, with the result that the Q or factor of merit of the coil 28 is decreased. To explain this effect in another way, the conductive member 16 acts like a short-circuited turn of a secondary winding, so that the coil 28 is loaded by the presence of the conductive member 16. Preferably, each conductive member 16 is made of soft iron or steel, or some other metal having a significant resistivity. In this way, the conductive member 16 will absorb a significant amount of energy when the conductive member is in the field of the coil 28. Thus, the strength of the oscillations in the coil 28 is decreased when any of the conductive members is moved into the field of the coil 28. Thus, each conductive member 16 modulates the oscillations in the coil 28.

Preferably, the variable feedback resistor 42 is adjusted so that the oscillations in the coil 28 are maintained, in the absence of the conductive members 16, but are stopped or terminated when any of the conductive members 16 is moved close to the coil 28. Thus, the oscillations are stopped whenever one of the conductive members 16 is moved past the coil 28. However, the oscillations in the coil 28 are started again on a spontaneous basis, when each conductive member 16 is moved away from the coil 28 by a sufficient distance.

This stopping and starting of the oscillations in the coil 28 constitute a high degree of modulation of such oscillations.

The conductive members 16 may be moved past the coil 28 at a repetition frequency which may vary over a wide range, from 0 to 66.7 Hertz, for example. The repetition frequency of 66.7 Hz represents a rotary speed of 2000 revolutions per minute, assuming that there are two of the conductive members 16 on the rotatable disc 18. The oscillations produced in the coil 28 by the oscillator circuit 30 are preferably at a considerably higher frequency, which may be on the order of 100 kiloHertz, for example.

Thus, the oscillator circuit 30, when modulated by the movement of the conductive member 16 past the inductance coil 28, produces a series of bursts of relatively high frequency oscillations, such bursts being at a relatively low repetition rate.

The sensor unit 24 preferably comprises pulse generating means 52 for converting the bursts of oscillations into repetitive pulses.

The pulse generating means 52 preferably comprise a nonlinear amplifier having an output current which increases substantially when each burst of oscillations is supplied to the input of the nonlinear amplifier.

As illustrated in FIG. 4, the pulse generating nonlinear amplifier 52 comprises two stages 54 and 56 which are directly coupled. The first amplifier stage 54 includes a transistor 58 having its emitter connected to the positive power supply line 34. The bursts of oscillations are coupled to the input of the first stage 54 by a coupling capacitor 60, connected between the collector of the oscillator transistor 32 and the base of the amplifier transistor 58. A return 62 is connected between such base and the negative power supply line 46.

The second amplifier stage 56 employs a transistor 64 having its emitter connected directly to the negative power supply line 46. A resistor 66 provides direct coupling between the emitter of the transistor 58 and the base of the transistor 64. A return resistor 68 is connected between such base and the negative power supply line 46. A capacitor 70 is connected in parallel with the resistor 68.

In this case, an indicator device 72 and a current limiting resistor 74 are connected in series between the collector of the transistor 64 and the positive power supply line 34. The indicator device 72 may be in the form of a light emitting diode (LED). A filtering or bypass capacitor 76 is connected between the positive and negative power supply lines 34 and 46, to bypass any high frequency currents.

When the oscillations in the oscillator circuit 30 are stopped, due to the presence of one of the conductive members 16 opposite the coil 28, the collector and emitter currents in both amplifier transistors 58 are quite small and are near cutoff, so that the LED 72 is not visibly lighted. Each burst of oscillations from the oscillator circuit 30 causes both transistors 58 and 64 to become highly conductive, so that the current through the LED 72 is limited mainly by the resistor 74. Thus, the LED 72 is brightly lighted. The pulses of current through the LED 72 also flow along the power lines 34 and 46, so that the pulses are transmitted along the power lines to the remainder of the apparatus.

As previously indicated, the sensor unit 24 is preferably supplied with power by a simple two wire cord 30, which may have wires or leads 80 and 82. A polarity correction circuit 84 is preferably connected to the leads 80 and 82, so that either of the leads may be positively polarized, while the other lead is negatively polarized. The polarity correction circuit 84 preferably comprises four diode rectifiers 84a, b, c and d, connected in a bridge circuit. The power supply leads 80 and 82 are connected to the input of the bridge, while the positive and negative power supply lines 34 and 46 are connected to the output of the bridge. If the lead 80 is positively polarized, the current will flow from the lead 80 through the diode 84c to the positive line 34. The return current will flow from the negative power line 46 through the diode 84b to the lead 82. If the lead 82 is positive, the current will flow from the lead 82 through the diode 84d to the positive power line 34. The return current will then flow from the line 46 through the diode 84a to the lead 80. Thus, either polarity of the two wire cord 30 is correct.

The power leads 80 and 82 supply the current for all three transistors 32, 58 and 64. The repetitive pulses in the output current of the transistor 64 thus are carried by the leads 80 and 82 so that such pulses are transmitted back to the remainder of the apparatus. The current pulses through the LED 72 and the transistor 64 are large enough to the reliably transmitted by the leads 80 and 82, eventhough such pulses are combined with the currents through the transistors 32 and 58.

Figure 5:
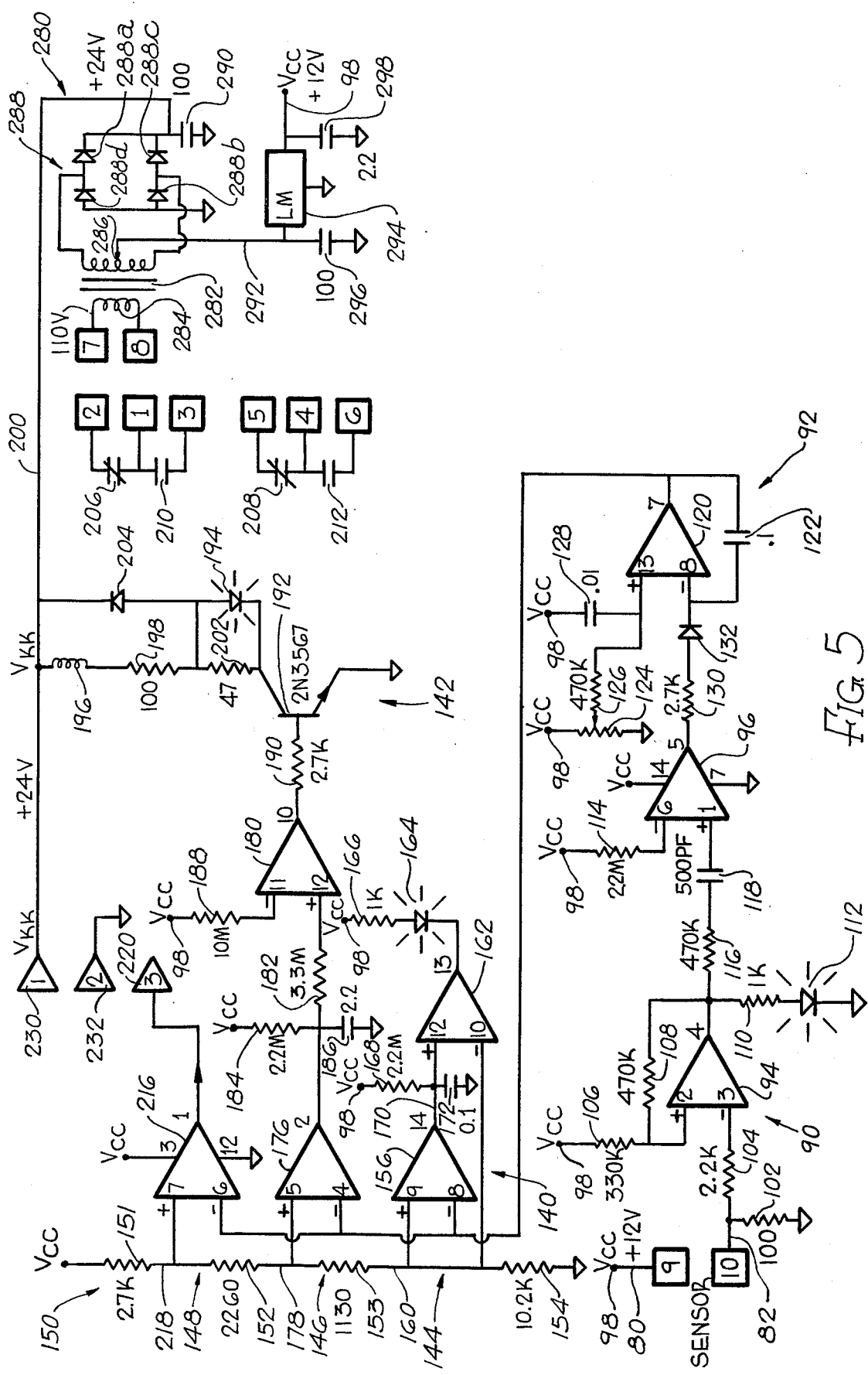
FIG. 5 is an electronic circuit diagram of the ramp generator means, the level detector means, and the control means for actuating an alarm and performing other control functions.

The two power supply leads or wires 80 and 82 also appear in FIG. 5, which illustrates current sensing means 90 and ramp generating means 92, adapted to be controlled by the repetitive pulses which flow along the leads 80 and 82. The current sensing means 90 preferably comprise a two stage current amplifier, utilizing operational current amplifiers 94 and 96. Various commercial types of operational current amplifier may be employed. For example, the amplifiers 94 and 96 may be components of an integrated circuit module type LM 2900.

In the circuit of FIG. 5, the lead 80 is connected directly to a positive power supply terminal 98, which is also labeled $V_{cc}$. The terminal 98 may supply plus 12 volts. The other power lead 82 is connected through a load or coupling resistor 102 to ground, which serves as the negative return terminal of the power supply. The repetitive current pulses flowing along the leads 80 and 82 produce voltage pulses across the resistor 102. Such voltage pulses may have a magnitude on the order of 2.5 volts, for example. These pulses are supplied to the inverting input of the operational amplifier 94 by a resistor 104, which is connected between the inverting input and the lead 82.

As shown in FIG. 5, the noninverting input of the operational amplifier 94 is supplied with a current bias through a high value resistor 106, connected between the positive power supply terminal 98 and the noninverting input. A certain amount of positive feedback is provided by a high value resistor 108, connected between the output of the amplifier 94 and the noninverting input. A current limiting resistor 110 and a light emitting diode (LED) 112 are connected in series between the output of the operational amplifier 94 and ground.

By virtue of the resistor 106, the operational current amplifier 94 is initially biased to deliver output current to the LED 112. Thus, the LED 112 is lighted in the absence of pulses from the sensor unit 24, supplied along the lead 82. Each current pulse along the lead 82 supplies current to the inverting input of the amplifier 94, in excess of the biasing current supplied to the positive input, and causes the output of the amplifier 94 to go low, so that the LED 112 is no longer lighted. At the end of each input pulse, the output of the amplifier 94 again goes high.

In the current sensing circuit 90 of FIG. 5, the second operational current amplifier 96 is initially biased to a low output state by a biasing current supplied to the inverting input from the positive power supply terminal 98, through a high value resistor 114. The pulses at the output of the first amplifier 94 are coupled to the noninverting input of the second amplifier 96 by a resistor 116 in series with a capacitor 118. Thus, each positive going pulse at the output of the amplifier produces a brief current pulse to the noninverting input of the amplifier 96. Such brief current pulse causes the output of the amplifier 96 to go high for the short duration of the pulse. Thus, the amplifier 96 produces brief output pulses corresponding to the input pulses.

Such output pulses from the amplifier 96 are preferably employed to reset the ramp generator 92. In the circuit of FIG. 5, the ramp generator 92 includes another operational current amplifier 120, which may be of the same type as the amplifiers 94 and 96. The amplifier 120 generates a ramp by charging a capacitor 122, connected between the output and the inverting input of the amplifier 120. The charging rate or current is controlled by supplying and adjustable biasing current to the noninverting input of the amplifier 120. Such adjustable biasing current is supplied by an adjustable potentiometer 124 connected between the positive power supply terminal 98 and ground. A high value resistor 126 is connected between the slider of the potentiometer 124 and the noninverting input of the amplifier 120. By adjusting the slider of the potentiometer 124, the voltage of the slider can be varied between 0 and 12 volts. The current supplied through the resistor 126 will be correspondingly varied. A filtering capacitor 128 is preferably connected between the power supply terminal 98 and the noninverting input of the amplifier 120.

The biasing current, supplied to the noninverting input, causes the output of the amplifier 120 to supply a corresponding charging current to the capacitor 122. Thus, the voltage across the capacitor 122 rises to produce a ramp signal at the output of the amplifier 120. Because of the negative feedback connection of the capacitor 122, the charging current to the capacitor 122 is comparable to but slightly less than the biasing current to the noninverting input.

Each positive pulse at the output of the amplifier 96 is employed to reset the ramp generating amplifier 120 to its initial state. Thus, the pulses at the output of the amplifier 96 are coupled to the inverting input to the amplifier 120 by a resistor 130 and a diode 132, connected in series between the output of the amplifier 96 and the inverting input of the ramp generating amplifier 120. Each positive current pulse through the resistor 130 and the diode 132 is supplied to the inverting input of the amplifier 120 and is much greater in magnitude than the biasing current, so that the output of the amplifier 120 is driven rapidly to a low state. Accordingly, the capacitor 122 is discharged. Thus, the output of the amplifier 120 is reset to zero. After each resetting pulse at the inverting input, the biasing current to the noninverting input again causes the amplifier 120 to charge the capacitor 122, so that another ramp signal is produced.

Thus, the repetitive pulses from the sensor unit 24, due to the movement of the conductive members 16 past the coil 28, reset the ramp generator 92, so that a repetitive series of ramp signals are produced. These ramp signals rise to a voltage level which is proportional to the time interval between the repetitive sensor pulses. For any particular time interval, the maximum voltage of the ramp signal can be adjusted by adjusting the potentiometer 124.

If the carrier disc 18 of FIG. 2 is rotating at its normal operating speed, the time interval between the successive passing movements of the conductive members 16 will be normal, so that the ramp signals will rise to their normal level. If the conveyor or other machine slow down, the rotary speed of the disc 18 will slow down correspondingly. Accordingly, the time intervals between the passing movements of the conductive members 16 will be increased, so that the ramp signals will rise to a higher level. FIG. 5 illustrates level detector means 140 for detecting any increase of the ramp signals above a predetermined level, and control means 142, operable by the level detector means 140, for actuating an alarm and performing other control functions, such as stopping the conveyor.

As shown in FIG. 5, the level detector means or circuits 140 comprise first voltage comparator means 144 for comparing the peak voltages of the ramp signals with a predetermined voltage level, corresponding to the normal or one hundred percent speed of the movable conductive members 16. The first voltage comparator means 144 may be employed for calibrating the motion monitoring apparatus. The level detector circuits 140 also comprise second voltage comparator means 146 for comparing the peak voltages of the ramp signals with a somewhat higher voltage level, corresponding to a predetermined reduction in the speed of the movable conductive member 16. In this case, for example, the second voltage comparator means 146 compare the ramp voltage signals with a voltage level corresponding to a ten percent reduction from the normal operating speed to a 90 percent speed.

In FIG. 5, the level detector circuits also include third voltage comparator means 148 for comparing the ramp signal voltage with a still higher voltage level, corresponding to a greater reduction in the operating speed, such as a twenty-five percent reduction, for example, to a 75 percent speed.

In the level detector circuits 140 to FIG. 5, the voltage levels to be employed for comparison purposes are produced by a voltage divider system 150, comprising resistors 151, 152, 153 and 154 connected between the positive power supply terminal 98 and ground. The three junctions between the four resistors 151–154 provide the three voltage levels, which are predetermined fractions of the power supply voltage, which is 12 volts in this instance.

The first voltage comparator means 144 preferably comprise an operational amplifier 156 of the voltage comparator type. Various commercially available operational amplifiers may be employed. For example, the operational amplifier 156 may consist of one unit of a multiple unit integrated circuit, type LM 339.

As shown in FIG. 5, the inverting input of the voltage comparator 156 is connected to a ramp signal output line 158, connected to the output of the ramp signal generating amplifier 120. The noninverting input of the voltage comparator 156 is connected to the junction 160 between the voltage dividing resistors 153 and 154. The output of the comparator 156 goes high if the reference voltage at the junction 160 is greater than the ramp signal voltage on the line 158. If the ramp signal voltage exceeds the reference voltage, the output of the comparator 156 goes low.

In order to provide an indication of the ramp signal voltage, the first comparator circuit 144 preferably includes a second operational amplifier 162 for operating an indicator, which is in the form of a light emitting diode (LED) 164 in this instance. A current limiting resistor 166 and the LED 164 are connected in series between the positive power supply terminal 98 and the output of the operational amplifier 162, which is also preferably of the voltage comparator type and may comprise another unit, the same as the amplifier 156 and constituting another unit of the same multiple unit integrated circuit. As shown, the inverting input of the amplifier 162 is connected to the junction 160, providing the same voltage level which is also supplied to the comparator amplifier 156. The noninverting input of the amplifier 162 is connected to the output of the amplifier 156. In this case, a high value resistor 168 is connected between the positive power supply terminal 98 and the lead 170 which extends between the output of the amplifier 156 and the noninverting input of the amplifier 62. A capacitor 172 is preferably connected between the lead 170 and ground. The capacitor 172 cooperates with the resistor 168 to provide a small time delay.

As previously indicated, the first voltage comparator circuit 144 of FIG. 5 may be employed to calibrate the magnitude of the ramp signals. Such calibration may be accomplished by adjusting the potentiometer 124 until the LED 164 is just barely flashing. This indicates that the ramp signal voltage on the line 158 is rising to the voltage level at the junction 160, corresponding with 100 percent or the normal operating speed of the rotatable disc 18.

The second voltage comparator circuit 146 of FIG. 5 preferably employs another operational amplifier 176 of the voltage comparator type. The amplifier 176 may be the same as the amplifier 156 and may constitute another unit of the same integrated circuit. As shown, the inverting input of the comparator amplifier 176 is connected to the ramp signal output line 158. The noninverting input of the comparator amplifier 176 is connected to the junction 178 between the resistors 152 and 153. Thus, the comparator 176 is supplied with a somewhat higher reference voltage than that supplied to the comparator 156.

When the reference voltage at the junction 178 exceeds the ramp signal voltage, the output of the comparator 176 goes high. When the ramp signal voltage exceeds the reference voltage, the output of the amplifier 176 goes low. This output change is employed to operate the control means 142, which may perform various control functions. As shown in FIG. 5, the control means 142 comprise another operational amplifier 180, which is preferably of the current amplifying type and may be the same as the amplifiers 94, 96 and 100. All of these operational current amplifiers may be components of the same integrated circuit.

As shown in FIG. 5, a high value resistor 182 is connected between the output of the comparator 176 and the noninverting input of the current amplifier 180. A load resistor 184 is connected between the positive power supply terminal 98 and the output of the comparator amplifier 176. As shown, a capacitor 186 is connected between the output of the amplifier 176 and ground. The capacitor 186 cooperates with the resistor 184 to provide a time delay.

As shown in FIG. 5, the inverting input of the current amplifier 180 is supplied with a biasing current by a high value resistor 188, connected between the inverting input and the positive power supply terminal 98. A resistor 190 is connected between the output of the amplifier 180 and the base of a transistor 192, adapted to control the operation of a light emitting diode (LED) 194 and a relay coil 196. In this case, the relay coil 196, a resistor 198, and the LED 194 are connected in series between a positive power supply line 200 and the collector of the transistor 192. The LED 194 is shunted by a resistor 202. A reversely polarized diode 204 is connected in parallel with the series combination of the relay coil 196 and the resistor 198. As shown, the emitter of the transistor 192 is connected to ground. The relay coil 196 is adapted to operate two sets of normally closed contacts 206 and 208, and two sets of normally open contacts 210 and 212.

When the carrier disc 18 for the movable conductive members 16 is rotating at its normal speed, the ramp signal voltage on the line 158 is always less than the reference voltage at the junction 178. Thus, the output of the comparator 176 goes and remains high. Likewise, the output of the amplifier 180 goes and remains high, so that the relay coil 196 and the LED 194 are energized. If the speed of the carrier disc 18 drops more than 10 percent below its normal speed, the ramp signal voltage rises above the reference voltage at the junction 178, with the result that the output of the comparator 176 goes low. Likewise, the output of the amplifier 180 goes low, so that the relay coil 196 and the LED are no longer actuated. The LED 194 can serve as an alarm. The relay contacts 206-212, operable by the relay coil 96, can be employed to carry out any desired control functions. For example, the contacts can be employed to actuate a remote alarm or to stop the conveyor or other machine, the speed of which is being monitored. As another possibility, the relay contacts may be employed to stop or start one or more associated machines.

As shown in FIG. 5, the third voltage comparator circuit 148 preferably comprises a voltage comparator in the form of an operational amplifier 216 which may be the same as the amplifiers 156 and 176 and may constitute another unit of the same multiple unit integrated circuit. As before, the inverting input of the comparator amplifier 216 is connected to the ramp circuit output line 158. The noninverting input of the amplifier 216 is connected to the junction 218 between the resistor 151 and 152. Thus, the comparator amplifier 216 is supplied with a reference voltage which is substantially higher than the reference voltage supplied to the amplifier 176. As long as the ramp signal remains less than the reference voltage at the junctions 218, the output of the comparator amplifier 116 will be high. In this case, the reference voltage corresponds to the amplitude of the ramp signal for a drop in speed of 25 percent. If the speed of the disc 18 drops by more than 25 percent, the peak voltage of the ramp signal will rise above the reference voltage, with the result that the output of the amplifier 216 will go low. This change in output can be employed to actuate a further alarm and to perform other control functions.

Figure 6:
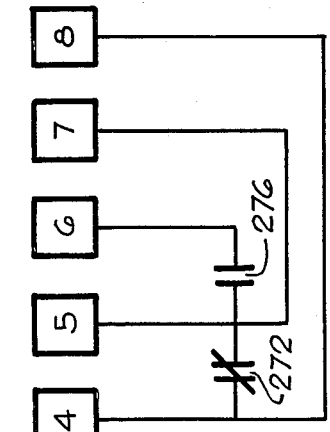
FIG. 6 is an electronic circuit diagram of an additional control module which may be employed in connection with the apparatus of FIG. 5.

In this case, the output of the comparator amplifier 216 is connected to an output terminal or contact 220, adapted to mate with an input terminal or contact on a separate control unit 224, shown in FIG. 6. The control unit 224 also has power supply input terminals or contacts 226 and 228, adapted to mate with power supply output terminals or contacts 230 and 232, shown in FIG. 5. It will be seen that the contact 230 is connected to the positive power supply line 200, which may supply +24 volts, for example. The contact 232 is connected to ground and thus to the negative side of the power supply.

Thus, in the control unit 224 of FIG. 6, a power supply voltage, such as +24 volts, appears between the contacts 226 and 228. Power supply lines 232 and 236 are connected to the contacts 226 and 228.

By virtue of the mating contacts 220 and 222, the output of the comparator amplifier 216 of FIG. 5 is connected to a lead 238 extending to the base of a transistor 240 in FIG. 6. The transistor 240 acts as an amplifier to drive a second transistor 242, adapted to energize a light emitting diode (LED) 244 and a relay 246.

The collector of the transistor 240 of FIG. 6 is supplied with a regulated operating voltage, such as +12 volts, for example, supplied to a line or lead 248, to which the collector is connected. As shown, a 12 volt Zener diode 250 and a filter capacitor 252 are connected in parallel between the 12 volt power line 248 and the negative power line 236. A voltage dropping resistor 254 is connected between the 24 volt power line 234 and the 12 volt power line 248.

A biasing resistor 216 is connected between the 12 volt power line 248 and the base of the transistor 240. As shown, a capacitor 258 is connected between the base of the transistor 240 and the negative power line 236. The capacitor 258 cooperates with the resistor 256 to provide a time delay.

As shown in FIG. 6, direct resistive coupling is provided between the emitter of the transistor 240 and the base of the transistor 242. Thus, a resistor 260 is connected between the emitter of the transistor 240 and the base of the transistor 242. A return resistor 262 is connected between the base and the negative supply lead 236. On the output side of the transistor 242, the emitter is connected to the negative supply lead 236, in this instance. The LED 244, the relay coil 246 and a resistor 264 are connected in series between the collector of the transistor 242 and the 24 volt power lead 234. A shunting resistor 266 is connected across the LED 244. It will be seen that a reversely polarized diode 268 is connected in parallel with the series combination of the relay coil 246 and the resistor 264.

The LED 244 can serve as an alarm. The relay coil 246 is adapted to operate two sets of normally closed relay contacts 270 and 272, and two sets of normally open contacts 274 and 276. These contacts can be employed to actuate alarm devices, to stop or start motors, and to perform other control functions.

As previously indicated, the output of the comparator amplifier 216 of FIG. 5 goes low if the ramp signal on the line 158 exceeds the reference voltage from the junction 218. When the output of the comparator amplifier 216 goes low, the transistors 240 and 242 become substantially nonconductive, so that the LED 244 and the relay coil 246 are no longer actuated. Thus, the positions of the relay contacts 270-276 are reversed, relative to their actuated positions.

FIG. 5 shows a power supply 280 which provides the positive voltages between the 12 volt power line or terminal 98 and ground, aand also between the 24 volt power line 200 and ground. Various power supply arrangements may be employed. As shown, the power supply 280 comprises a power transformer 282 having a primary winding 284 adapted to receive alternating current at 110 volts and 60 hertz, or any other suitable voltage and frequency. The transformer 282 has a center tapped secondary winding 286, the ends of which are connected to the input of a bridge rectifier circuit 288, comprising four diodes 288a, b, c and d. The output of the bridge rectifier 288 is connected between the +24 volt power line 200 and ground. A filter capacitor 290 is connected between the power line 200 and ground.

The 12 volt power supply is derived from the center tap lead 292 of the secondary winding 286. As shown, a voltage regulator circuit 294 is connected between the lead 292 and the +12 volt power line 98. A filter capacitor 296 is connected between the lead 292 and ground. A second filter capacitor 298 is connected between the 12 volt power line 98 and ground.

The illustrated motion monitoring apparatus is fully capable of operating reliably with a pulse repetition rate of 4000 pulses per minute. The sensor unit of FIGS. 1, 2 and 4 produces one pulse whenever one of the conductive members 16 moves past the inductance coil 28.

Each pulse from the sensor unit 24 resets the ramp signal generator 92, so that a new ramp signal is started. The voltage of the ramp signal rises until the next resetting pulse is received. Thus, one ramp signal pulse is produced for each resetting pulse from the sensor unit 24. If the sensor pulse rate is 4000 pulses per minute, the ramp signal rate will also be 4000 pulses per minute.

Each ramp signal pulse rises to a voltage which is proportional to the time interval between the corresponding sensor pulses.

The maximum voltage achieved by the ramp signal pulses is checked by the level detector circuits 140. The first voltage comparator circuit 144 establishes the reference voltage for normal or 100 percent operating speed. The apparatus is calibrated by adjusting the ramp rate potentiometer 124 until the indicating LED 164 is just barely flashing, which indicates that the ramp pulse voltage is equal to the reference voltage for 100 percent speed, or some other level of speed.

If the speed of the disc 18 drops by more than 10 percent the ramp pulse voltage rises to a level above the reference voltage applied to the second voltage comparator circuit 146. The output of the comparator amplifier 176 goes low, which causes the control circuit 142 to deenergize the relay coil 196 and the LED 194.

If the disc 18 slows down by more than 25 percent below its normal speed, the ramp pulse voltage becomes greater than the reference voltage supplied to the third voltage comparator circuit 148. The output of the comparator amplifier 216 goes low, so that the control unit 224 of FIG. 6 deenergizes the LED 244 and the relay coil 246.

The LEDS 194 and 244 can serve as alarms. The relay contacts 206-212, operable by the coil 196, and the contacts 270-276, operable by the coil 246, can be employed to perform any desired control functions, such as the actuation of alarm devices, the stopping of the machine which is being monitored, or the starting or stopping of one or more associated machines.

It will be understood that various values and type designations can be assigned by those skilled in the art to the various components of the apparatus, to achieve the desired operating characteristics. For convenience, many of the components in the drawings have been marked with illustrative parts values and designations which have been found to be satisfactory. It will be understood that these values can be modified over a wide range by those skilled in the art, to modify the operating parameters. The values of resistors are given in ohms, while the values of capacitors are given in microfarads, unless otherwise marked. The values of some of the capacitors are given in picofarads (pf).

By ay of further example, the inductance coil 28 may be wound with fifty turns of wire and may be about two inches in diameter and one fourth of one inch long. It will be understood that the construction of the coil may be varied, and that the frequency of the oscillations in the coil may also be varied.

I claim:

1. A device for monitoring the motion of a movable element, comprising
   sensor means for producing a series of repetitive pulses in response to the motion of the movable element and at a repetition rate corresponding of the speed thereof,
   ramp generator means for producing an increasing ramp signal,
   said ramp generator means including means for resetting said ramp signal to a starting level in response to each of said pulses,
   said ramp generator means including an operational current amplifier having an output and inverting and noninverting inputs,
   a timing capacitor connected between said output and said inverting input,
   adjustable means for supplying current at a controlled adjustable rate to and noninverting input and thereby causing said capacitor to be charged at a corresponding controlled rate,
   and means for supplying said repetitive pulses to said inverting input for causing the discharge of said capacitor in response to each of said pulses whereby the ramp signal at said output is reset to zero,
   said ramp signal rising to a voltage level which increases with any decrease in the repetition rate of said repetitive pulses,
   reference voltage source means including first means for producing a first reference voltage,
   first comparator means for comparing said ramp signal with said first reference voltage,
   said first comparator means having first output means operable when said ramp signal rises above said first reference voltage,
   said reference voltage source means including second means for producing a second reference voltage which is greater than said first reference voltage by a particular percentage,
   second comparator means for comparing said ramp signal with said second reference voltage,
   and second output means for performing an output function when said ramp signal rises above said second reference voltage,
   said adjustable means being operable with the aid of said first output means to calibrate the relationship between said ramp signal and said first reference voltage at a particular operating speed of said movable member whereby said second output means will be operative at a particular percentage reduction in the speed of said movable element below said operating speed.

2. A device for monitoring the motion of a movable element, comprising
   sensor means for producing a series of repetitive pulses in response to the motion of the movable element and at a repetition rate corresponding to the speed thereof,
   ramp generator means for producing an increasing ramp signal,
   said ramp generator means including means for resetting said ramp signal to a starting level in response to each of said pulses,
   said ramp signal rising to a level which increases with any decrease in the repetition rate of said repetitive pulses,
   reference signal means including first means for producing a first reference signal,
   first comparator means for comparing said ramp signal with said first reference signal,
   said first comparator means including first output means operable when said ramp signal rises above said first reference signal,
   said reference signal means including second means for producing a second reference signal which is greater than said first reference signal by a particular percentage,
   second comparator means for comparing said ramp signal with said second reference signal,
   second output means for performing an output function when said ramp signal rises above said second reference signal,
   and adjusting means for adjusting the relationship between said ramp signal and said first reference signal,
   said adjusting means being operable with the aid of said first output means to calibrate the relationship between said ramp signal and said first reference signal at a particular operating speed of said movable element whereby said second output means will be operative at a particular percentage reduction in the speed of said movable element below said operating speed.

3. A device according to claim 2, in which
   said reference signal means includes a reference signal source having a voltage divider with first and second output connections constituting said first and second means for producing said first and second reference signals.

4. A device according to claim 2, in which
   said adjusting means comprises means for adjusting the rise rate of said ramp signal.

* * * * *

UNITED STATES PATENT AND TRADEMARK OFFICE
CERTIFICATE OF CORRECTION

PATENT NO. : 4,237,517
DATED : December 2, 1980
INVENTOR(S) : Donald M. Myers

It is certified that error appears in the above-identified patent and that said Letters Patent are hereby corrected as shown below:

Column 1, line 19, "automotic" should be -- automatic --

Column 5, line 34, after "return" insert -- resistor --

Column 7, line 13, after "amplifier" insert -- 94 --

Column 8, line 48, "to" should be -- of --

Column 9, line 26, "62" should be -- 162 --

Column 10, line 36, "96" should be -- 196 --

Column 11, line 28, "216" should be -- 256 --

Column 12, line 30, after "signal" insert -- pulse --

Column 13, line 8, "ay" should be -- way --

Column 13, line 32, "and" should be -- said --

Signed and Sealed this

Seventeenth Day of March 1981

[SEAL]

Attest:

RENE D. TEGTMEYER

*Attesting Officer*  *Acting Commissioner of Patents and Trademarks*